US 8,189,600 B2

(12) United States Patent
Jabr et al.

(10) Patent No.: US 8,189,600 B2
(45) Date of Patent: May 29, 2012

(54) METHOD FOR IP ROUTING WHEN USING DYNAMIC VLANS WITH WEB BASED AUTHENTICATION

(75) Inventors: Khalil Jabr, Austin, TX (US); S. Scott Van De Houten, Geneva, FL (US); Jason Frazier, Raleigh, NC (US); Victor Moreno, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 779 days.

(21) Appl. No.: 11/400,855

(22) Filed: Apr. 10, 2006

(65) Prior Publication Data

US 2007/0237148 A1    Oct. 11, 2007

(51) Int. Cl.
*H04L 12/28*    (2006.01)
*H04L 12/56*    (2006.01)
(52) U.S. Cl. .............. 370/395.53; 370/351; 370/389; 370/397; 370/399; 370/409; 370/419
(58) Field of Classification Search .............. 370/409, 370/419
See application file for complete search history.

(56) References Cited

U.S. PATENT DOCUMENTS

| | | | | |
|---|---|---|---|---|
| 7,280,540 B2* | 10/2007 | Halme et al. | .............. | 370/392 |
| 7,283,534 B1* | 10/2007 | Kelly et al. | .............. | 370/395.54 |
| 7,568,107 B1* | 7/2009 | Rathi et al. | .............. | 713/182 |
| 2002/0138628 A1* | 9/2002 | Tingley et al. | .............. | 709/227 |
| 2003/0177211 A1* | 9/2003 | Cyr et al. | .............. | 709/222 |
| 2004/0223500 A1* | 11/2004 | Sanderson et al. | .............. | 370/395.53 |
| 2004/0250117 A1* | 12/2004 | Congdon | .............. | 713/201 |
| 2004/0252722 A1* | 12/2004 | Wybenga et al. | .............. | 370/474 |
| 2005/0055570 A1* | 3/2005 | Kwan et al. | .............. | 713/201 |
| 2005/0074015 A1* | 4/2005 | Chari et al. | .............. | 370/400 |
| 2005/0190788 A1* | 9/2005 | Wong et al. | .............. | 370/466 |
| 2006/0062187 A1* | 3/2006 | Rune | .............. | 370/338 |
| 2007/0086398 A1* | 4/2007 | Tiwari | .............. | 370/338 |
| 2009/0003221 A1* | 1/2009 | Burns et al. | .............. | 370/241 |

* cited by examiner

*Primary Examiner* — Jae Y Lee
(74) *Attorney, Agent, or Firm* — Patterson & Sheridan, LLP

(57) ABSTRACT

A method, apparatus and computer program product for providing IP Routing when using dynamic virtual local area networks (VLANs) with web based authentication. A downstream VLAN is assigned to a first switch port of a first network device. A first upstream VLAN is also assigned to the first switch port of the first network device. The first upstream VLAN is changed to a second upstream VLAN upon authentication, and the downstream VLAN is maintained.

18 Claims, 3 Drawing Sheets

METHOD FOR IP ROUTING WHEN USING DYNAMIC VLANS WITH WEB BASED AUTHENTICATION

BACKGROUND

Computer networks have become ubiquitous. Computer networks include the Internet, Service Provider (SP) networks, private networks, and Local Area Networks (LANs). A network such as an SP network may include peripherally located Provider Edge (PE) routers, each of which couples to one or multiple Customer Edge (CE) routers. The PE routers are used to maintain routing and forwarding context for each customer. The CE routers may couple to private LANs associated with one or multiple customers.

Dynamic Host Configuration Protocol (DHCP) is a protocol used to enable individual computers on an Internet Protocol (IP) network to extract some of their configuration from a server (the 'DHCP server') or servers, in particular, servers that have no exact information about the individual computers until they request the information. The overall purpose of this is to reduce the work necessary to administer a large IP network. The most significant piece of information distributed in this manner is the IP address and default gateway.

An IP address (also called an IP number) is a number (typically written as four numbers separated by periods, i.e., 107.4.1.3 or 84.2.1.111), which uniquely identifies a computer that is making use of the Internet. The IP address is used by the Internet to direct data to a user's computer, e.g. the data the user's web browser retrieves and displays when a user surfs the net. One task of DHCP is to assist in the problem of getting a functional and unique IP number into the hands of the computers that make use of the Internet.

In a dynamic virtual local area network (VLAN), a switch locates the VLAN assignment of the device that is connected to its port and automatically assigns that port to the VLAN it locates. With network management programs it is possible to define a VLAN at the level of hardware address (MAC or Media Access Control), protocol, or even at the level of implementation. As an example, in a system wherein MAC addresses are entered to a central VLAN management implementation. When a device is connected to a port of a switch which is not assigned with a VLAN, the MAC address is requested from the VLAN database; then the VLAN value obtained is assigned to that port of the switch. If the user changes or the device that is connected to the port changes, a new VLAN value is requested, and then it is assigned to the port. If the database is created carefully, this reduces the burden of administration and configuration tasks for the administrator.

Most enterprises want to do more for security than simply employing usernames and passwords for access, so an authentication protocol, called the Extensible Authentication Protocol (EAP), was developed. EAP sits inside of the Point-to-Point (PPP) authentication protocol and provides a generalized framework for several different authentication methods. EAP is supposed to head off proprietary authentication systems and let everything from passwords to challenge-response tokens and public-key infrastructure certificates all work smoothly.

With a standardized EAP, interoperability and compatibility of authentication methods becomes simpler. For example, when a user dials a remote-access server (RAS) and uses EAP as part of its PPP connection; the RAS doesn't need to know any of the details about the user's authentication system. Only the user and the authentication server have to be coordinated. By supporting EAP authentication a RAS server gets out of the business of acting as middle man, and just packages and repackages EAP packets to hand off to a server that will do the actual authentication.

The IEEE 802.1x standard is a standard for passing EAP over a wired or wireless LAN. With 802.1x, EAP messages are packaged in Ethernet frames and don't use PPP. It's authentication and nothing more. This is desirable in situations in which the rest of PPP isn't needed, when the user is using protocols other than TCP/IP, or where the overhead and complexity of using PPP is undesirable.

In 802.1x the user or client that wants to be authenticated is called a supplicant. The actual server doing the authentication is called the authentication server, and the device in between, such as a wireless access point, is called the authenticator. One of the key points of 802.1x is that the authenticator can be relatively simple as all of the processing power can reside in the supplicant and the authentication server. This makes 802.1x ideal for wireless access points, which are typically small and have little memory and processing power.

The protocol in 802.1x is called EAP encapsulation over LANs (EAPOL). It is currently defined for Ethernet-like LANs including 802.11 wireless, as well as token ring LANs such as Fiber Distributed Data Interface (FDDI). There are a number of modes of operation, and an example is presented as follows.

a. An authenticator sends an "EAP-Request/Identity" packet to the supplicant as soon as it detects that the link is active (e.g., the supplicant system has associated with the access point).

b. The supplicant sends an "EAP-Response/Identity" packet to the authenticator, which is then passed on to the authentication (RADIUS) server.

c. The authentication server sends back a challenge to the authenticator, such as with a token password system. The authenticator unpacks this from IP and repackages it into EAPOL and sends it to the supplicant. Different authentication methods will vary this message and the total number of messages. EAP supports client-only authentication and strong mutual authentication. Strong mutual authentication is considered appropriate for the wireless case.

d. The supplicant responds to the challenge via the authenticator and passes the response onto the authentication server.

e. If the supplicant provides proper identity, the authentication server responds with a success message, which is then passed onto the supplicant. The authenticator now allows access to the LAN (possibly restricted based on attributes that came back from the authentication server). For example, the authenticator might switch the supplicant to a particular virtual LAN or install a set of firewall rules.

Dynamic VLANs are used with 802.1x authentication to move devices into the appropriate VLAN based upon user identity. After the user has been authenticated and moved into the appropriate VLAN, DHCP assigns the user device an IP address and other networking information to access the network.

Address Resolution Protocol (ARP) is a protocol for mapping an Internet Protocol address (IP address) to a physical machine address that is recognized in the local network. For example, in IP Version 4, the most common level of IP in use today, an address is 32 bits long. In an Ethernet local area network, however, addresses for attached devices are 48 bits long. (The physical machine address is also known as a Media Access Control or MAC address.) A table, usually called the ARP cache, is used to maintain a correlation between each MAC address and its corresponding IP address. ARP provides the protocol rules for making this correlation and providing address conversion in both directions.

In ARP, when an incoming packet destined for a host machine on a particular local area network arrives at a gateway, the gateway asks the ARP program to find a physical host or MAC address that matches the IP address. The ARP program looks in the ARP cache and, if it finds the address, provides it so that the packet can be converted to the right packet length and format and sent to the machine. If no entry is found for the IP address, ARP broadcasts a request packet in a special format to all the machines on the LAN to see if one machine knows that it has that IP address associated with it. A machine that recognizes the IP address as its own returns a reply indicating this. ARP updates the ARP cache for future reference and then sends the packet to the MAC address that replied.

VPNs provide a secured means for transmitting and receiving data between network nodes even though a corresponding physical network supporting propagation of the data is shared by many users (and VPNs). In a typical networking environment used for routing data, the environment may include a number of Customer Edge (CE) routers, a number of Provider Edge (PE) routers and a packet-switched network (PSN). Data, encapsulated in layer-2 frames, may be forwarded from a first CE router to a first PE router, from the first PE router across the PSN to a second PE router, and from the second PE router to a second CE router.

A Pseudowire (PW) may be utilized to transfer data across the PSN. A Pseudowire is a mechanism that emulates attributes of a service such as Asynchronous Transfer Mode (ATM), Frame Relay (FR), Point-to-Point Protocol (PPP), High Level Data Link Control (HDLC), Synchronous Optical Network (SONET) Frames or Ethernet over a PSN. The functions provided by the PW include encapsulating Protocol Data Units (PDUs) arriving at an ingress port, carrying them across a path or tunnel, managing their timing and order, and any other operations required to emulate the behavior and characteristics of the particular service.

SUMMARY

Conventional mechanisms such as those explained above suffer from a variety of deficiencies. Web based authentication plays a critical role in environments were an 802.1x supplicant cannot be used. When 802.1x web base proxy authentication is used, a DHCP IP address must be assigned to the end user device before the login web page can be accessed to authenticate the user. This creates a problem with dynamic VLANs because when the VLAN changes, a DHCP release/renew for a new IP address cannot easily be triggered for the new VLAN. When 2547 VPNs are used for the purpose of segmentation, not being able to change the IP address of the end device will cause a reachability problem for inter-VRF traffic unless Network Address Translation (NAT) is used. NAT is an Internet standard that enables a LAN to use one set of IP addresses for internal traffic and a second set of addresses for external traffic. A NAT box located where the LAN meets the Internet makes all necessary IP address translations. The use of NAT in this type of environment can cause application problems and is generally not desired.

Embodiments of the invention significantly overcome such deficiencies and provide mechanisms and techniques that present a method and apparatus for IP routing when using dynamic VLANs with web based authentication. By using unidirectional VLANs on switches, dynamic VLANs with web based authentication are allowed without having to force a release/renew of the IP address of the end host. This method does not require alterations to the DHCP functionality available in the diverse selection of clients that can be connected to a LAN. It only requires alterations to the network infrastructure. This avoids the cumbersome task of altering the stacks on the wide variety of host Operating Systems available in the industry.

In a particular embodiment of a method for providing IP Routing when using dynamic virtual local area networks (VLANs) with web based authentication, the method includes assigning a downstream VLAN to a first switch port of a first network device. The method further includes assigning a first upstream VLAN to the first switch port of the first network device. Additionally, the method includes changing the first upstream VLAN to a second upstream VLAN upon successful authentication and maintaining the downstream VLAN.

Other embodiments include a computer readable medium having computer readable code thereon for providing for IP Routing when using dynamic virtual local area networks (VLANs) with web based authentication. The medium includes instructions for assigning a downstream VLAN to a first switch port of a first network device. The medium also includes instructions for assigning a first upstream VLAN to the first switch port of the first network device. The medium additional includes instructions for changing the first upstream VLAN to a second upstream VLAN upon successful authentication and maintaining the downstream VLAN.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method and apparatus for IP routing when using dynamic VLANs with web based authentication as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method and apparatus for IP routing when using dynamic VLANs with web based authentication as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
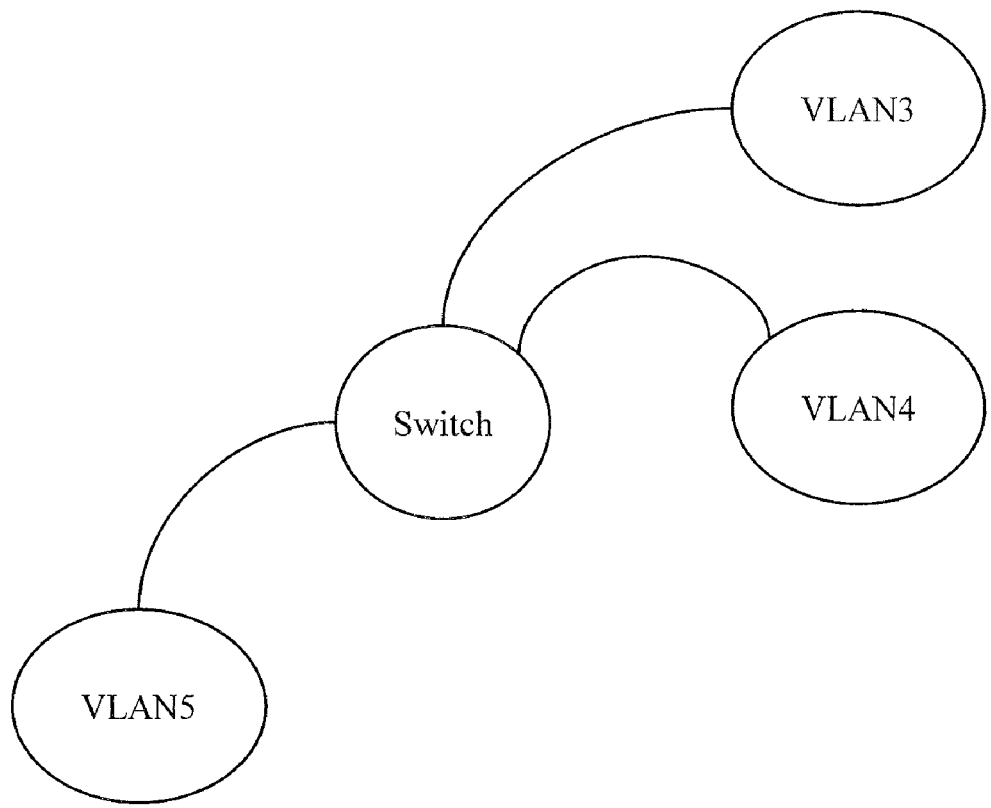
FIG. 1 comprises a block diagram of a particular embodiment of an environment for performing IP routing when using dynamic VLANs with web-based authentication.

The present invention for performing IP routing when using dynamic VLANs with web-based authentication incorporates the user of unidirectional VLANs. A downstream VLAN, and an upstream VLAN can be assigned to each switch port. The VLAN downstream to the user would stay consistent but, the upstream VLAN from the end user would change based on the authentication policy. An operational example is shown in FIG. 1.

When a networking device is assigned an IP address via DHCP and is served an IP address to login to the network, changing the VLAN will not force the PC to release/renew its IP address. This becomes an issue when multiple VRFs or RFC2547 VPNs are used for segmentation within the network. During the authentication phase the user would be assigned to an authentication VLAN/VPN. Once a successful authentication is complete, the user's device would be assigned to a different VLAN (such as a guest VLAN or a student VLAN etc.). The new assigned VLAN is then mapped to a VRF (VPN) that allows the user to reach certain network resources. However, since the IP address of the user's device did not change, the return traffic from the network will not be able to reach the end user because its IP address is on the wrong VLAN.

Initially the upstream VLAN that is assigned to an end user would be assigned to VLAN3, and the downstream VLAN to the end user assigned to VLAN5. The authentication VPN cannot reach any network resources other than authentication resources. The user boots the PC, gets an IP address via DHCP, launches a web browser, and the first hop switch redirects TCP Port 80 HTTP traffic to a login web page on the switch. The end user enters the username/password, and the directly attached switch determines through authentication that this user belongs to the Guest VPN. Stated differently, a successful login has occurred. The switch changes the upstream VLAN for the end user from VLAN3 to VLAN4, however it will keep the downstream VLAN as VLAN5. The user now will be able to reach any network resource that is accessible via VPN Guest (VLAN4). From the perspective of the rest of the network, the user is still reachable via the Regular_Access VPN since the VLAN assigned to the downstream direction is assigned to VLAN5. In such a manner, the IP address of the end user does not have to change. If the login attempt failed, the upstream VLAN would remain as VLAN3 and the user would not have access to any network resource that is accessible via VPN Guest (VLAN4).

Upon a successful login, the IP address of the default gateway changes since the user now belongs to a different VPN after authentication. The first layer 3 hop must be able to reply to ARP requests that are being sent to the default gateway for VLAN3/Authentication VPN. The client preserves the Authentication VPN IP GWY address as assigned in the original DHCP lease. In this scenario, the first hop switch needs to use the same MAC in each VRF for the default gateway.

When a DHCP lease renewal is sent by the client it is desirable that the DHCP relay (first Layer 3 hop) writes the giaddr field in the new request with the same IP address used in the original DHCP request (i.e., giaddr=GWY IP for the Authentication VRF). This allows the DHCP server to renew the lease in the correct scope.

The MAC address table requires special handling since the traffic from the end user will be seen via a different VLAN than the transmit VLAN. The directly attached switch is able to program the user's MAC address in the MAC address table of the transmit VLAN when it sees any packets from the user on the receive VLAN on that port.

In another embodiment of a method for IP Routing when using dynamic virtual local area networks (VLANs) with web based authentication, after assigning a downstream VLAN to a first switch port of a first network device and assigning a first upstream VLAN to the first switch port of the first network device the changing the first upstream VLAN to a second upstream is based on the source MAC address that the user is assigned to. With this, during the authentication phase, the authenticating switch captures the source MAC address to be used for upstream VLAN selection after successful authentication. Such a scheme allows multiple users to share the same switch port.

Figure 2:
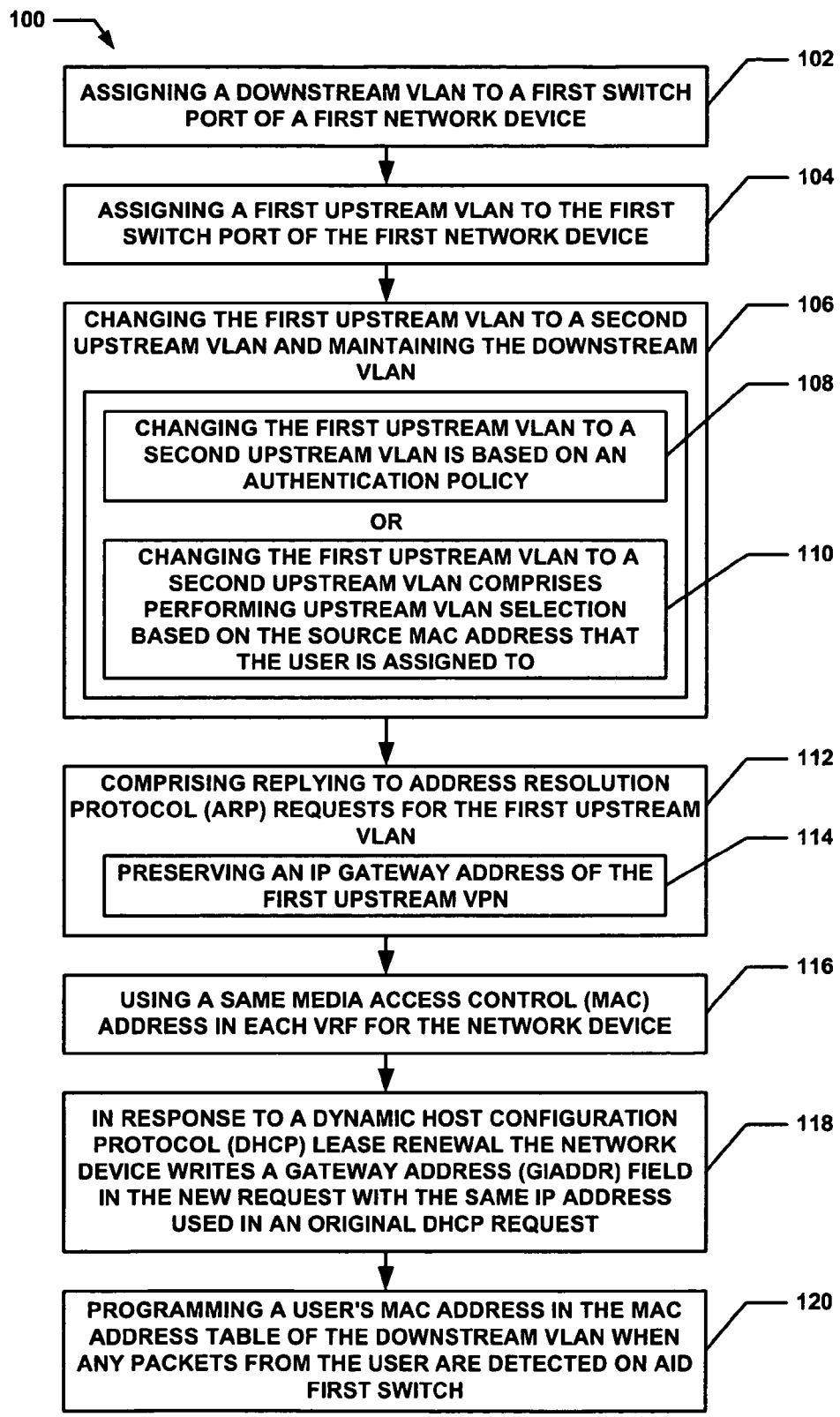
FIG. 2 comprises a flow diagram of a particular embodiment of a method for performing IP routing when using dynamic VLANs with web-based authentication in accordance with embodiments of the invention.

A flow chart of a particular embodiment of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 for IP routing when using dynamic VLANs with web based authentication is shown. The method 100 begins with processing block 102 which discloses assigning a downstream VLAN to a first switch port of a first network device.

Processing block 104 recites assigning a first upstream VLAN to the first switch port of the first network device. This may be a regular access VPN.

Processing block 106 states changing the first upstream VLAN to a second upstream VLAN and maintaining the downstream VLAN. This may be an authentication LAN used to authenticate users.

Processing block 108 discloses changing the first upstream VLAN to a second upstream VLAN based on an authentication policy. Processing block 110 states the changing the first upstream VLAN to a second upstream VLAN comprises performing upstream VLAN selection based on the source MAC address that the user is assigned to. With this, during the authentication phase, the authenticating switch captures the source MAC address to be used for upstream VLAN selection after successful authentication. Such a scheme allows multiple users to share the same switch port.

Processing block 112 recites replying to Address Resolution Protocol (ARP) requests for the first upstream VLAN. Processing block 114 discloses preserving an IP gateway address of the first upstream VPN. The client preserves the Authentication VPN IP GWY address as assigned in the original DHCP lease. In this scenario, the first hop switch needs to use the same MAC in each VRF for the default gateway. Processing block 116 states using a same Media Access Control (MAC) address in each VRF for the network device.

Processing block 118 discloses wherein in response to a Dynamic Host Configuration Protocol (DHCP) lease renewal the network device writes a gateway address (giaddr) field in the new request with the same IP address used in an original DHCP request. When a DHCP lease renewal is sent by the client it is desirable that the DHCP relay (first Layer 3 hop) writes the giaddr field in the new request with the same IP address used in the original DHCP request (i.e., giaddr=GWY IP for the Authentication VRF). This allows the DHCP server to renew the lease in the correct scope.

Processing block 120 states programming a user's MAC address in the MAC address table of the downstream VLAN when any packets from the user are detected on aid first switch. The MAC address table requires special handling since the traffic from the end user will be seen via a different VLAN than the transmit VLAN. The directly attached switch is able to program the user's MAC address in the MAC address table of the transmit VLAN when it sees any packets from the user on the receive VLAN on that port.

Figure 3:
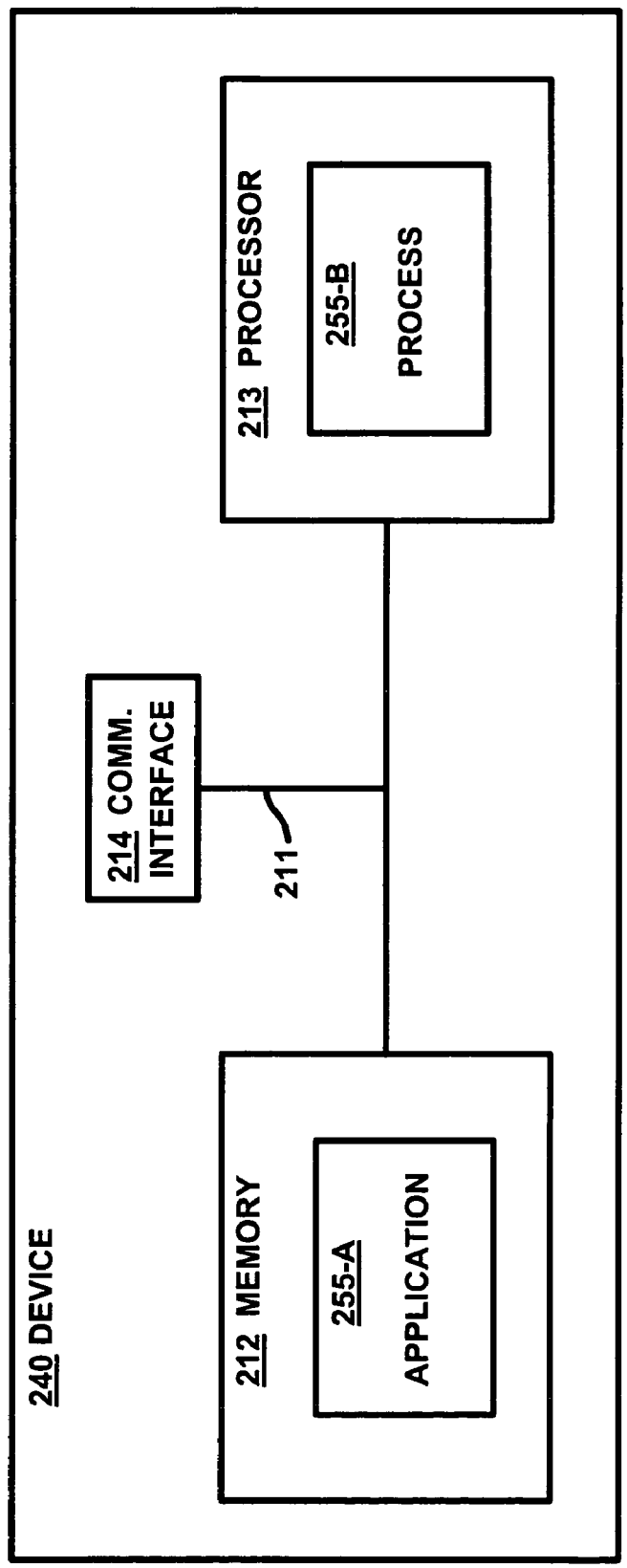
FIG. 3 illustrates an example computer system architecture for a computer system that performs IP routing when using dynamic VLANs with web-based authentication in accordance with embodiments of the invention.

FIG. 3 illustrates an example architecture of a network device that is configured as a network device 240. The network device 240 may be any type of computerized system such as a personal computer, workstation, portable computing device, mainframe, server, switch, router or the like. In this example, the network device includes an interconnection mechanism 211 that couples a memory system 212, a processor 213, and a communications interface 214. The communications interface 214 allows the network device system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the network device.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method, comprising:
   in a network configured to support a plurality of virtual local area networks (VLANs) to provide access to at least a set of unprotected resources and a set of protected resources, wherein the set of unprotected resources includes an authentication service for accessing the set of protected resources:
   granting access to the set of protected resources to a user device having a VLAN Internet Protocol (IP) address for accessing the set of unprotected resources, without rendering the user device unreachable from the network, without changing the VLAN IP address of the user device, and without using network address translation (NAT), wherein the VLAN IP address comprises an IP address on a VLAN, and wherein the granting access to the set of protected resources comprises:
   prior to authenticating the user device by the authentication service:

assigning a uni-directional downstream VLAN to a first switch port of a network device for communicating downstream network traffic to the user device; and assigning a uni-directional authentication upstream VLAN to the first switch port of the network device for communicating upstream network traffic from the user device, wherein the uni-directional authentication upstream VLAN is configured to provide access to the set of unprotected resources; and upon successful authentication of the user device by the authentication service via the uni-directional downstream VLAN and the uni-directional authentication upstream VLAN, changing from the uni-directional authentication upstream VLAN to a uni-directional access upstream VLAN on the first switch port of the network device, while maintaining the uni-directional downstream VLAN on the first switch port of the network device, wherein the uni-directional access upstream VLAN is configured to provide access to the set of protected resources;

wherein the uni-directional downstream VLAN, the uni-directional authentication upstream VLAN, and the uni-directional access upstream VLAN are associated with separate Virtual Private Network (VPN) connections that send network traffic in only one direction.

2. The method of claim 1, further comprising:
replying to Address Resolution Protocol (ARP) requests from the user device for the uni-directional authentication upstream VLAN by preserving an IP address for a default gateway of the uni-directional authentication upstream VLAN as a current default gateway when the upstream VLAN is changed to the uni-directional access upstream VLAN.

3. The method of claim 1, wherein a Media Access Control (MAC) address for a default gateway in the uni-directional authentication upstream VLAN and a default gateway in the uni-directional access upstream VLAN are the same.

4. The method of claim 1, further comprising:
changing a gateway IP address in a Dynamic Host Configuration Protocol (DHCP) lease renewal request to a gateway IP address for the uni-directional authentication upstream VLAN, in response to receiving the DHCP lease renewal.

5. The method of claim 1, further comprising:
programming a Media Access Control (MAC) address for the user device in a MAC address-table for the uni-directional downstream VLAN when packets from the user device are detected on the first switch port.

6. The method of claim 1, wherein the VLAN IP address is maintained when changing to the uni-directional access upstream VLAN, wherein the user device acquires access to one or more network resources on the uni-directional access upstream VLAN while remaining reachable from the uni-directional downstream VLAN, and wherein authentication of the user device is based, at least in part, on an authentication policy and a Media Access Control (MAC) address for the user device.

7. The method of claim 6, further comprising:
replying to Address Resolution Protocol (ARP) requests from the user device for the uni-directional authentication upstream VLAN by preserving an Internet Protocol (IP) address for a default gateway of the uni-directional authentication upstream VLAN as a current default gateway when the upstream VLAN is changed to the uni-directional access upstream VLAN.

8. The method of claim 7, wherein a MAC address for the default gateway in the uni-directional authentication upstream VLAN and a default gateway in the uni-directional access upstream VLAN are the same, wherein the MAC address for the user device is programmed in a MAC address-table for the uni-directional downstream VLAN when packets from the user device are detected on the first switch port, and wherein a gateway IP address in a Dynamic Host Configuration Protocol (DHCP) lease renewal request is changed to a gateway IP address for the uni-directional authentication upstream VLAN, responsive to receipt of the DHCP lease renewal request.

9. A network device in a network, comprising:
a memory;
a processor;
a communications interface; and
a bus coupling the memory, the processor and the communications interface;
wherein the network is configured to support a plurality of virtual local area networks (VLANs) to provide access to at least a set of unprotected resources and a set of protected resources, wherein the set of unprotected resources includes an authentication service for accessing the set of protected resources, wherein the network device is operatively connected to a user device having a VLAN Internet Protocol (IP) address for accessing the set of unprotected resources, wherein the user device is configured to be granted access to the set of protected resources, without rendering the user device unreachable from the network, without changing the VLAN IP address of the user device, and without using network address translation (NAT), wherein the VLAN IP address comprises an IP address on a VLAN;
wherein the communications interface includes a first switch port configured to, prior to the user device being authenticated by the authentication service, be assigned to a uni-directional downstream VLAN and to a uni-directional first upstream VLAN, wherein the uni-directional first upstream VLAN is configured to, upon successful authentication of the user device via the uni-directional downstream VLAN and the uni-directional first upstream VLAN, be changed to a uni-directional second upstream VLAN on the first switch port of the network device, while the uni-directional downstream VLAN on the first switch port of the network device is maintained, wherein the uni-directional first upstream VLAN is configured to provide access to the set of unprotected resources, and wherein the uni-directional second upstream VLAN is configured to provide access to the set of protected resources;
wherein the uni-directional downstream VLAN, the uni-directional first upstream VLAN, and the uni-directional second upstream VLAN are associated with separate Virtual Private Network (VPN) connections that send network traffic in only one direction.

10. The network device of claim 9, wherein the uni-directional first upstream VLAN is configured to be changed to the uni-directional second upstream VLAN based, at least in part, on an authentication policy and a Media Access Control (MAC) address of the user device.

11. The network device of claim 9, wherein the network device is configured to reply to Address Resolution Protocol (ARP) requests from the user device for the uni-directional first upstream VLAN by preserving an IP address for a default gateway of the uni-directional first upstream VLAN as a current default gateway when the upstream VLAN is changed to the uni-directional second upstream VLAN.

12. The network device of claim 9, wherein a Media Access Control (MAC) address for a default gateway in the uni-directional first upstream VLAN and a default gateway in the uni-directional second upstream VLAN are the same.

13. The network device of claim 9, wherein the processor is configured to change a gateway IP address in a Dynamic Host Configuration Protocol (DHCP) lease renewal request to a gateway IP address for the uni-directional first upstream VLAN, in response to receiving the DHCP lease renewal request.

14. The network device of claim 9, wherein a Media Access Control (MAC) address for the user device is programmed in a MAC address table for the uni-directional downstream VLAN when packets from the user device are detected.

15. A non-transitory computer-readable medium storing computer readable instructions that when executed by a computer cause the computer to perform an operation comprising:
  in a network configured to support a plurality of virtual local area networks (VLANs) to provide access to at least a set of unprotected resources and a set of protected resources, wherein the set of unprotected resources includes an authentication service for accessing the set of protected resources:
    granting access to the set of protected resources to a user device having a VLAN Internet Protocol (IP) address for accessing the set of unprotected resources, without rendering the user device unreachable from the network, without changing the VLAN IP address of the user device, and without using network address translation (NAT), wherein the VLAN IP address comprises an IP address on a VLAN, and wherein the granting access to the set of protected resources comprises:
      prior to authenticating the user device by the authentication service:
        assigning a uni-directional downstream VLAN to a first switch port of a network device operatively connected to the user device; and
        assigning a uni-directional first upstream VLAN to the first switch port of the network device, wherein the uni-directional first upstream VLAN is configured to provide access to the set of unprotected resources; and
      upon successful authentication of the user device by the authentication service via the uni-directional downstream VLAN and the uni-directional first upstream VLAN, changing the uni-directional first upstream VLAN to a second upstream VLAN on the first switch port of the network device, while maintaining the uni-directional downstream VLAN on the first switch port of the network device,
    wherein the uni-directional second upstream VLAN is configured to provide access to the set of protected resources;
    wherein the uni-directional downstream VLAN, the uni-directional first upstream VLAN, and the uni-directional second upstream VLAN are associated with separate Virtual Private Network (VPN) connections that send network traffic in only one direction.

16. The non-transitory computer-readable medium of claim 15, wherein changing the uni-directional first upstream VLAN to the uni-directional second upstream VLAN is a function of one or more of an authentication policy, and the source Media Access Control (MAC) address assigned to the user device.

17. The non-transitory computer-readable medium of claim 15, wherein the operation further comprises:
  replying to Address resolution Protocol (ARP) requests for the uni-directional first upstream VLAN;
  preserving an IP gateway address of the uni-directional first upstream virtual private network (VPN);
  using a same Media Access Control (MAC) address in VPN routing and forwarding tables (VRFs) for the network device; and
  programming a MAC address of the user device in the MAC address table of the uni-directional downstream VLAN when packets from the user are detected on the first switch.

18. The non-transitory computer-readable medium of claim 15, wherein the operation further comprises:
  writing a gateway address (giaddr) field in a new request with the same IP address used in an original Dynamic Host Configuration Protocol (DHCPI request in response to a DHCP lease renewal.

* * * * *

UNITED STATES PATENT AND TRADEMARK OFFICE
CERTIFICATE OF CORRECTION

PATENT NO. : 8,189,600 B2                                                                 Page 1 of 1
APPLICATION NO. : 11/400855
DATED : May 29, 2012
INVENTOR(S) : Jabr et al.

It is certified that error appears in the above-identified patent and that said Letters Patent is hereby corrected as shown below:

Column 6, Line 3, please delete "usemame/password" and insert -- username/password -- therefor;

Column 12, Claim 18, Line 42, please delete "(DHCPI" and insert -- (DHCP) -- therefor.

Signed and Sealed this
Twenty-eighth Day of August, 2012

David J. Kappos
*Director of the United States Patent and Trademark Office*